(12) United States Patent
Guo

(10) Patent No.: US 11,940,292 B2
(45) Date of Patent: Mar. 26, 2024

(54) UNIVERSAL ELECTRONIC HUBODOMETER

(71) Applicant: Zhiguo Guo, Shanghai (CN)

(72) Inventor: Zhiguo Guo, Shanghai (CN)

( * ) Notice: Subject to any disclaimer, the term of this patent is extended or adjusted under 35 U.S.C. 154(b) by 155 days.

(21) Appl. No.: 17/354,524

(22) Filed: Jun. 22, 2021

(65) Prior Publication Data

US 2021/0396544 A1 Dec. 23, 2021

Related U.S. Application Data

(60) Provisional application No. 63/042,536, filed on Jun. 22, 2020.

(51) Int. Cl.
| | | |
|---|---|---|
| *G01C 22/00* | (2006.01) | |
| *G01P 15/00* | (2006.01) | |
| *H04Q 9/00* | (2006.01) | |
| *H04W 4/80* | (2018.01) | |

(52) U.S. Cl.
CPC .............. *G01C 22/00* (2013.01); *G01P 15/00* (2013.01); *H04Q 9/00* (2013.01); *H04Q 2209/43* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 6,940,940 B2 | 9/2005 | Kranz | |
| 2004/0083811 A1* | 5/2004 | Kranz | G01C 22/02 |
| | | | 73/490 |
| 2019/0277653 A1* | 9/2019 | Stewart, Jr. | B60Q 1/305 |
| 2021/0164803 A1* | 6/2021 | Shepheard | G01C 22/02 |

FOREIGN PATENT DOCUMENTS

CN 210426572 4/2020

* cited by examiner

*Primary Examiner* — Kristy A Haupt
(74) *Attorney, Agent, or Firm* — Tumey L.L.P.

(57) ABSTRACT

A universal electronic hubodometer with a single sensor system and method capable of electronically monitoring and/or processing the rotations of an object (e.g., a hubcap, wheel-hub, wheel, or tire) and wirelessly communicating any measured data to a mobile device (e.g., a mobile phone, PDA, cell phone, smartphone, or tablet). In one embodiment the universal electronic hubodometer may be capable of electronically determining the revolutions of an object using a single accelerometer while managing to overcome the problems of current hubodometers.

14 Claims, 4 Drawing Sheets

UNIVERSAL ELECTRONIC HUBODOMETER

CROSS-REFERENCE TO RELATED APPLICATIONS

This application is a nonprovisional application that claims the benefit of U.S. Provisional Application Ser. No. 63/042,536 filed on Jun. 22, 2020, the disclosure of which is incorporated by reference herein in its entirety.

STATEMENT REGARDING FEDERALLY SPONSORED RESEARCH OR DEVELOPMENT

Not applicable.

BACKGROUND OF THE INVENTION

Field of the Invention

The present invention relates to the field of hubcap, wheel-hub, or wheel mounted odometers. More particularly, the invention relates to a system and method for monitoring and/or processing rotation data of an object. Most particularly, the invention relates to a single accelerometer sensor system and method capable of electronically monitoring and/or processing the rotation data of an object available in various sizes (e.g., a hubcap, wheel-hub, wheel, or tire) and wirelessly communicating any necessary data or information between the system and an operator of a vehicle via a mobile device (e.g., a mobile phone, PDA, cell phone, smartphone, laptop, or tablet).

Background of the Invention

Determining the rotation of an object, particularly in the case of wheel-hubs for trucks, tractors, trailers, semi-trucks, recreational vehicles, and/or other commercial vehicles, may be highly beneficial. Said vehicles often utilize components in which accurate information regarding distance traveled can aid in determining when to schedule vehicle maintenance, verifying vehicle part warranties, and/or calculating the road usage expense in certain countries.

Currently, vehicle operators may utilize mechanical or electronic hubodometers to monitor distance traveled for a particular wheel-hub. Typically, the hubodometers are attached to the wheel-hub of a vehicle to allow them to sense the rotation of a vehicle's wheel during motion. A mechanical hubodometer senses rotation of the wheel by utilizing an internal weighted mechanism designed to remain stationary within the hubodometer relative to the rotating wheel during motion. This stationary design allows for relative motion within the hubodometer which can drive a geared mechanism, having a fixed transmission ratio, to determine the distance a vehicle has traveled. However, a mechanical hubodometer can often report inaccurate data, particularly when vehicle operators have to brake or accelerate suddenly, or if they are driving on rough or uneven roads. These situations can result in the weighted mechanism of the mechanical hubodometer to rotate along with the rotating wheel, thus eliminating the relative motion and inhibiting the hubodometer from accurately reading the distance traveled. This issue can be difficult to address because while it is important to have a weighted mechanism heavy enough to avoid rotation, it also needs to be light enough to allow for a balanced wheel set. Further, the geared mechanism having the fixed transmission ratio can be somewhat problematic. Since the transmission ratio is based on the size of a vehicle's tires, having a fixed transmission ratio requires an operator to utilize various hubodometers in order to accurately determine the distance traveled for each differently sized tire.

Alternatively, vehicle operators may utilize electronic hubodometers to manage the problems associated with mechanical hubodometers. Typically, an electronic hubodometer utilizes multiple accelerometer sensors in order to evaluate wheel rotation and distance traveled. However, the use of multiple accelerometers makes for a more complex system, which inevitably increases production costs and results in higher battery power consumption over a period of time. Further, current electronic hubodometers lack a means for effectively and efficiently communicating information or data between hubodometer and operator, including wireless communication.

Consequently, there is a need for a universal electronic hubodometer with a single accelerometer sensor system and method capable of electronically monitoring and/or processing rotation data of an object available in various sizes and wirelessly communicating any necessary data or information between the universal electronic hubodometer and the operator of a vehicle via a mobile device.

BRIEF SUMMARY OF SOME OF THE INVENTION

These and other needs in the art are addressed in one embodiment by a universal electronic hubodometer comprising: an accelerometer comprising a single accelerometer sensor for measuring force in any given direction; a microcontroller unit (MCU), wherein the MCU processes data generated by the accelerometer; a communication module, wherein the communication module wirelessly transmits any data processed by the MCU to a mobile device and wirelessly receives any data from the mobile device; and a power supply, wherein the power supply provides power to the accelerometer, the MCU, and the communication module; wherein the accelerometer, the MCU, the communication module, and the power supply are configured onto a printed circuit board (PCB) and disposed within an outer housing.

These and other needs in the art are addressed in one embodiment by a method for monitoring rotation data of an object comprising: attaching a universal electronic hubodometer to a hubcap on a wheel of a vehicle, wherein the universal electronic hubodometer comprises: an accelerometer comprising a single accelerometer sensor for measuring force in any given direction; a microcontroller unit (MCU), wherein the MCU processes data generated by the accelerometer; a communication module, wherein the communication module wirelessly transmits any data processed by the MCU to a mobile device and wirelessly receives any data from the mobile device; and a power supply, wherein the power supply provides power to the accelerometer, the MCU, and the communication module; wherein the accelerometer, the MCU, the communication module, and the power supply are configured onto a printed circuit board (PCB) and disposed within an outer housing; allowing the accelerometer to activate upon detection of vibration and generate accelerometer data; allowing the MCU to collect and process the generated accelerometer data into useful data comprising revolution count, distance, velocity, and acceleration of an object; and transmitting the useful data to the communication module to allow an operator wireless access to the useful data via the mobile device.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE INVENTION

Figure 1:
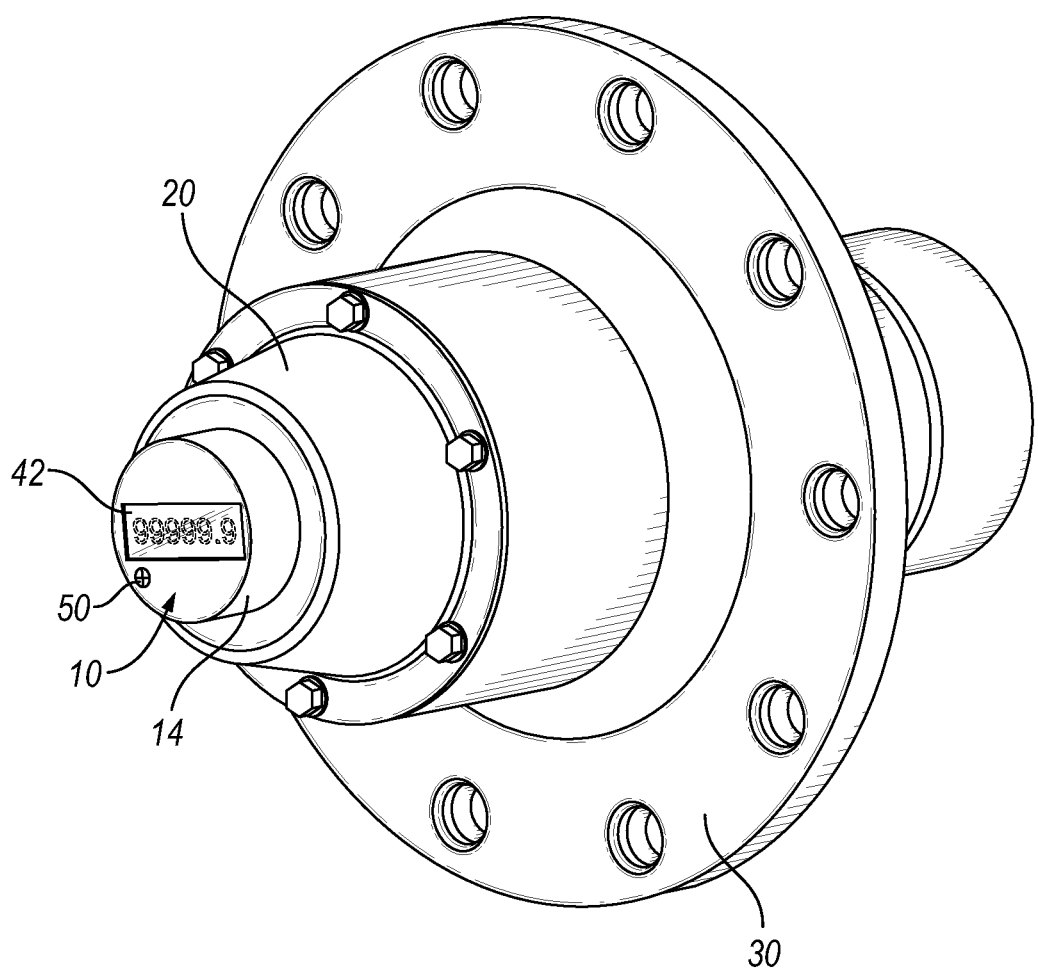
FIG. 1 illustrates a universal electronic hubodometer installed on a hubcap in accordance with certain embodiments of the present disclosure.
Figure 2:
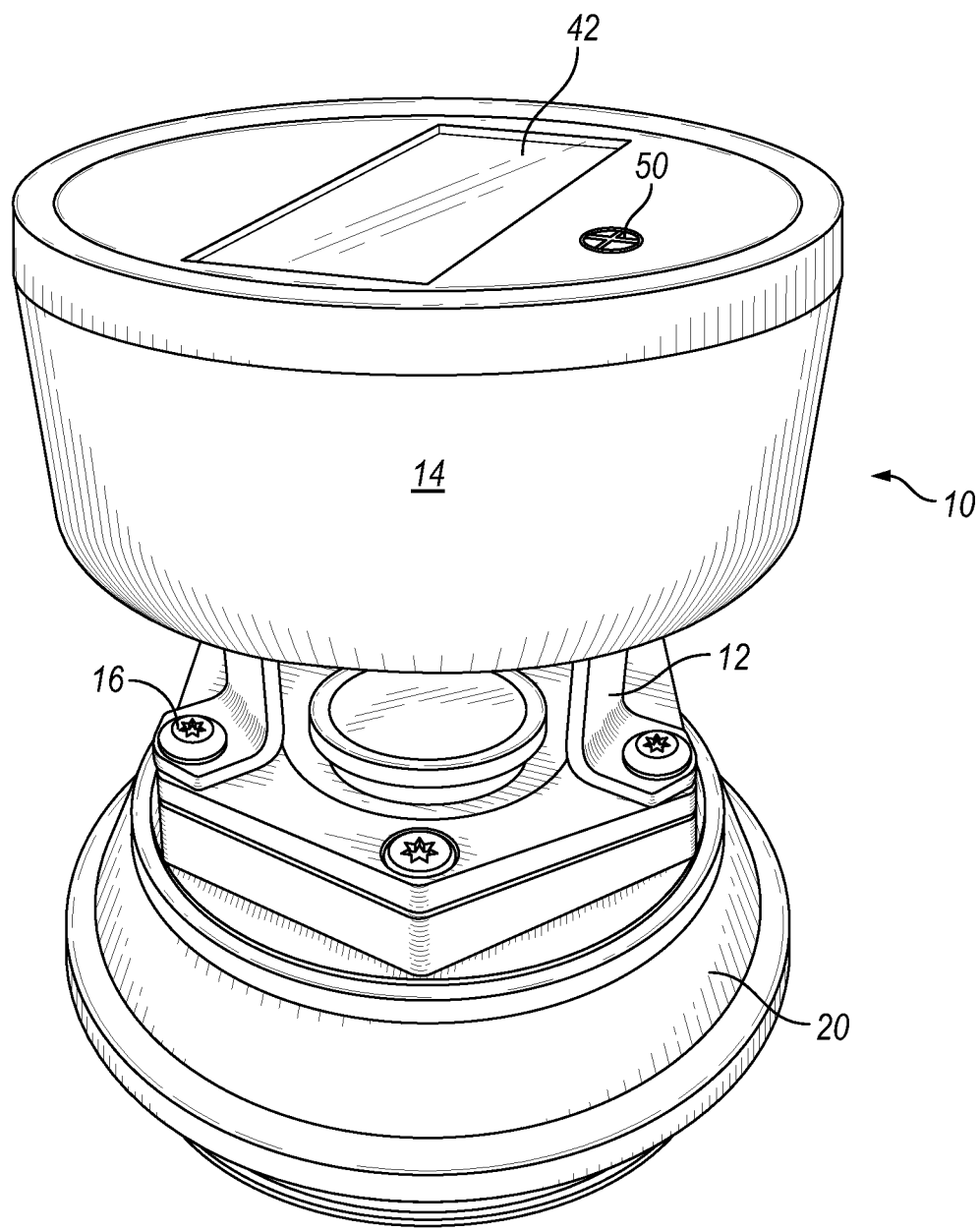
FIG. 2 illustrates a universal electronic hubodometer installed on an alternative hubcap in accordance with certain embodiments of the present disclosure.

FIG. 1 illustrates an embodiment of a universal electronic hubodometer 10. Hubodometer 10 may be installed on a hubcap 20 of a wheel-hub 30 such that the components may be fixed to one another and rotate together in accordance with a corresponding vehicle wheel or tire. In embodiments, hubodometer 10 may be attached to hubcap 20 by any suitable means including, without limitation, the use of a threaded attachment, bolts, screws, magnets, adhesive, or any combinations thereof. In one embodiment, hubodometer 10 may comprise legs 12 (as illustrated in FIG. 2) that may be used to secure hubodometer 10 to hubcap 20 via bolts and/or screws 16. Legs 12 may be L-shaped, extend from a back side of hubodometer 10, and comprise clearance holes in which bolts and/or screws 16 may travel through as they are received by threads disposed within hubcap 20, thus allowing for secure fastening of hubodometer 10 to hubcap 20. Alternatively, hubodometer 10 may be installed to vehicle wheel-hub 30 via an injection molded stud disposed on a black plate of hubodometer 10.

In embodiments, hubodometer 10 may comprise various electronic components disposed within an outer housing 14. Outer housing 14 may be an enclosure manufactured from any suitable materials such as, without limitation, metals, plastics, or combinations thereof. In embodiments, outer housing 14 may be durable and sealed, and therefore capable of providing protection to the electronic components of hubodometer 10 from environmental elements such as, without limitation, dust, dirt, debris, moisture, high and low temperatures, or combinations thereof. The shape and size of outer housing 14 may be dictated by the electronic components within. In embodiments, outer housing 14 may be cylindrically shaped and of a compact size suitable for placement on hubcap 20.

Figure 3:
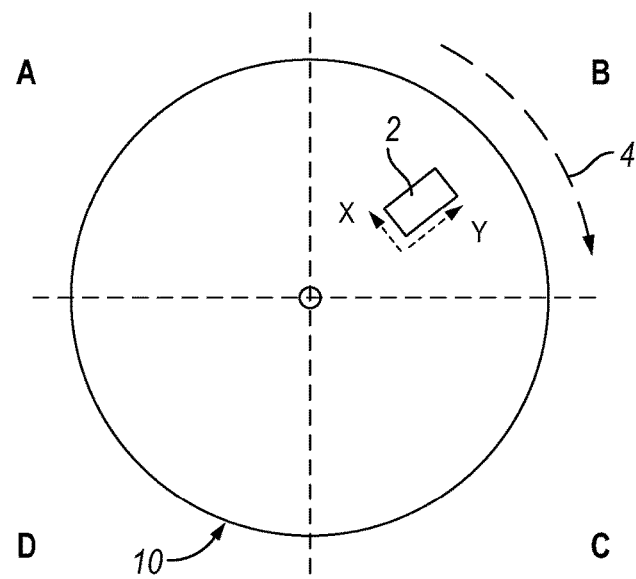
FIG. 3 illustrates positioning of an accelerometer within the universal electronic hubodometer in accordance with certain embodiments of the present disclosure.
Figure 4:
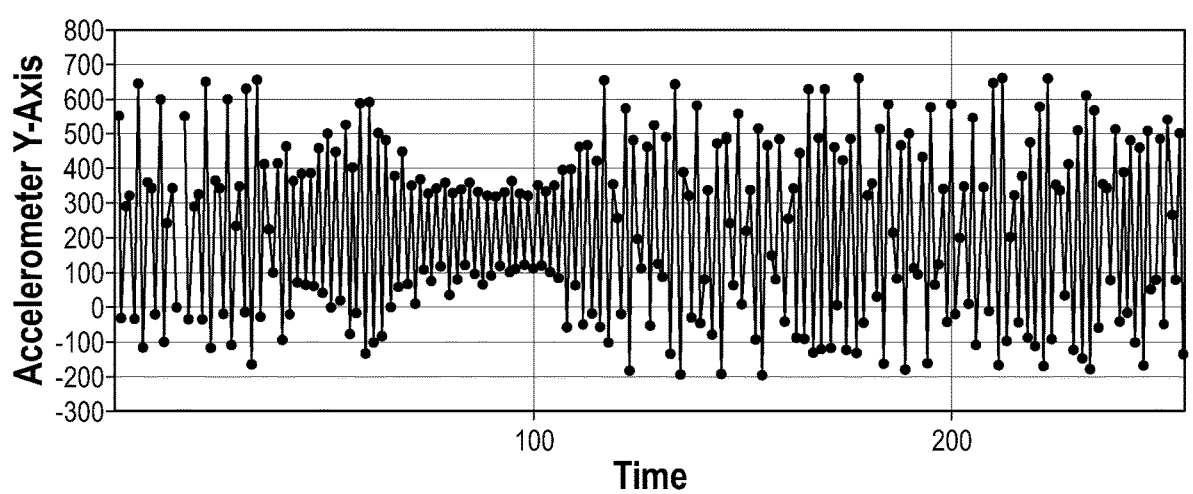
FIG. 4 is a graph illustrating the linear measured force sensed by one axis of the accelerometer in accordance with certain embodiments of the present disclosure.

In embodiments, the electronic components of hubodometer 10 may comprise an accelerometer 2 capable of generating rotation data for an object to which it may be attached (e.g., a hubcap, wheel-hub, wheel, or tire). Accelerometer 2 of hubodometer 10 may comprise a single accelerometer sensor capable of measuring the force in any given direction. For instance, single accelerometer sensor may sense a force on one axis and generate an electrical voltage signal that may be proportional to an angel of the axis to the gravity direction. In embodiments, the single accelerometer sensor may utilize a single axis, or alternatively, multiple axes. In one embodiment, the single sensor accelerometer may be a 3-axis digital accelerometer. In an example, as illustrated in FIG. 3, accelerometer 2 comprising the single accelerometer sensor and disposed within hubodometer 10 may detect force along any single axis (e.g., the x-axis or the y-axis) as hubodometer 10 rotates in the direction of arrow 4 (clockwise). If detection is occurring in the y-axis, one revolution of hubodometer 10 may cause the direction of the y-axis acceleration to change from positive to negative and back to positive. In other words, when hubodometer 10 comprising accelerometer 2 begins to rotate clockwise from its original position in Quadrant B, the y-axis directional vector or force may be positive. As rotation continues accelerometer 2 may be placed into Quadrants C and then D, which will cause the y-axis directional vector or force to become negative. Finally, rotation of hubodometer 10 such that accelerometer 2 may be in Quadrant A will cause the y-axis directional vector or force to become positive once again. Therefore, with one complete revolution, the y-axis directional vector changes from positive to negative, back to positive or vice versa. These changes may generate an accelerometer signal that may be used to determine data such as, with limitation, the revolution count, distance, velocity, and acceleration of an object. FIG. 4 illustrates an example of an accelerometer signal that may be generated by accelerometer 2. By this method, this data may be determined regardless of hubcap, wheel-hub, wheel, and/or tire size being monitored by hubodometer 10. Further by this method, there may be no relative movement within hubodometer 10 during operation, and therefore no internal wear-and-tear of hubodometer 10.

In embodiments, accelerometer 2 may be disposed at any location within hubodometer 10. For instance, accelerometer 2 may be positioned about the center of hubodometer 10, or alternatively may be offset from the center (as is illustrated in FIG. 3). Placement of accelerometer 2 may be an important aspect in determining how the monitored and recorded rotation data, including the accelerometer signal, should be processed. In embodiments, accelerometer 2 may be disposed at angle between about 45° and about 75° relative to the center. Alternatively, accelerometer 2 may be disposed at an angle of about 60° relative to the utilized axis. Further, accelerometer 2 may be disposed at a distance between about 5 mm to about 25 mm from the center of hubodometer 10. This positioning may be optimum placement for monitoring rotations of hubodometer 10 since a greater distance from the center may cause signal interference of the centrifuge force and a smaller distance may reduce the sensitivity of the single accelerometer sensor.

Figure 5:
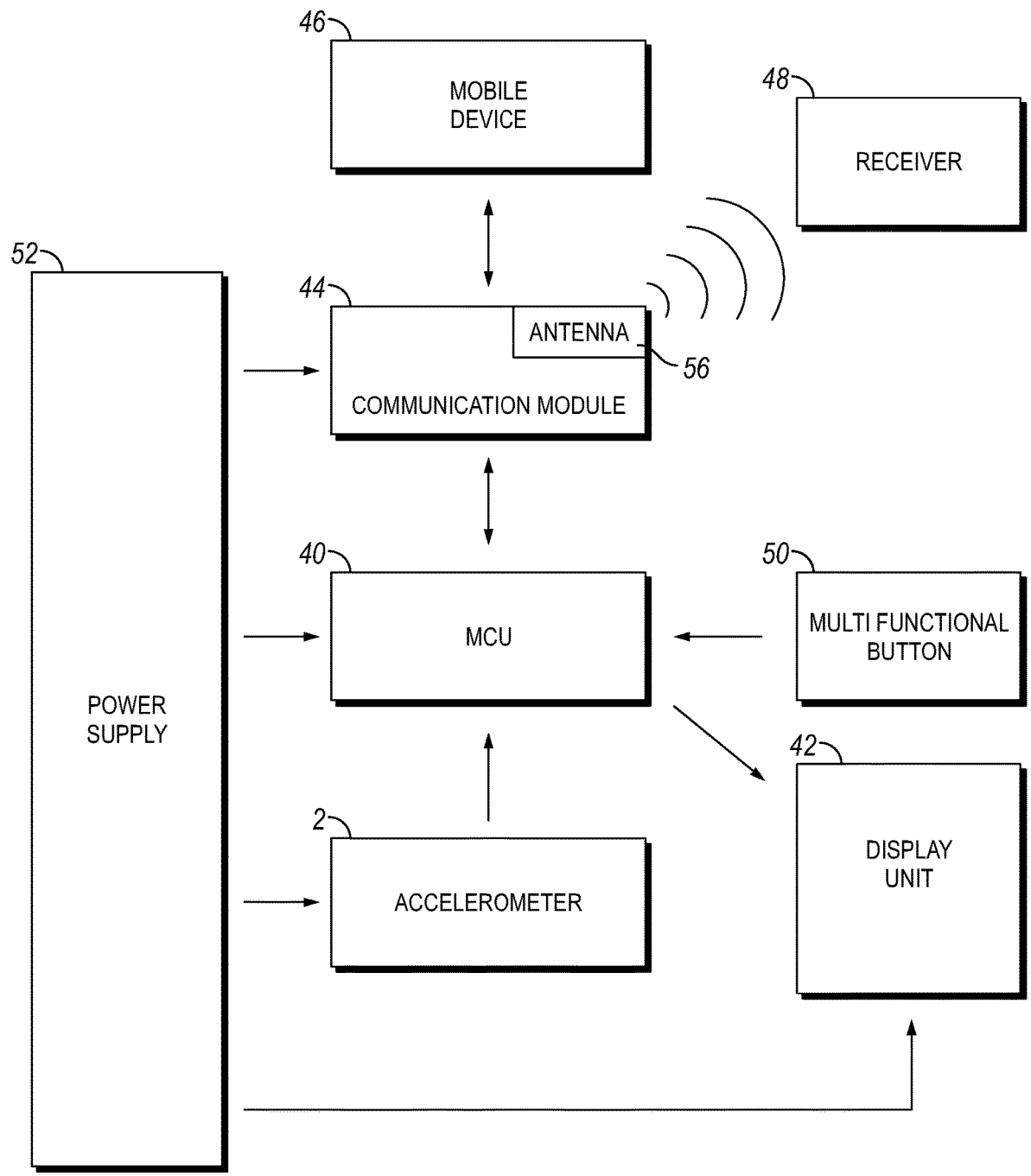
FIG. 5 is a diagram illustrating the interconnection between the different functional components of the universal electronic hubodometer in accordance with certain embodiments of the present disclosure.

In embodiments, referring now to FIG. 5, the electronic components of hubodometer 10 may further comprise a microcontroller unit (MCU) 40, a display unit 42, a multifunctional button 50, and a communication module 44. As may be illustrated by the flow diagram, MCU 40 may receive, calculate, analyze, and process the data generated by accelerometer 2, particularly the accelerometer signal. To aid in this processing and calculation, MCU 40 may comprise internal read-only memory (ROM) as well as random access memory (RAM). In embodiments, MCU 40, having a proper scanning frequency may be capable of performing electronic data manipulation on the accelerometer signal such that the data may be accurately processed to calculate the revolution count, distance, velocity, and acceleration of the object in operation. For example, mileage may be calculated by multiplying the revolutions by the rotation circumference of a tire. Further, MCU 40 may be capable of converting the data generated by accelerometer 2 into a format that may be transmitted to display unit 42 and communication module 44.

In embodiments, display unit 42 may be disposed on a front face of hubodometer 10 (illustrated in FIGS. 1 and 2) and may operate in communication with MCU 40. The display unit 42 may comprises a display such as, without limitation, a light emitting diode (LED), a liquid crystal display (LCD), or the like. Further, the display may have any suitable dimensions. In embodiments, MCU 40 may control display unit 42 such that hubodometer 10 readings (e.g., distance traveled in miles, and/or kilometers) and other data may be visually available to an operator. Other data may comprise tire size setting data. In addition to display unit 42, a multifunctional button 50 may also be disposed on the front face of hubodometer 10 (illustrated in FIGS. 1 and 2) and may operate in communication with MCU 40. Multifunctional button 50 may be a capacitive touch button capable of activating or deactivating display unit 42 as well as manipulating what information may be shown by display unit 42. Further, multifunctional button 50 may be capable of placing hubodometer 10 into a Bluetooth pairing mode so as to allow connection to an external device. In some embodiment, multifunction button 50 may also be used to toggle tire size or rotating radius.

In embodiments, a communication module 44 may be provided to wirelessly communicate any necessary data or information between hubodometer 10 and a mobile device 46 and vice versa. Mobile device 46 may be, without limitation, a mobile phone, PDA, cell phone, smartphone, laptop, tablet, or combinations thereof. In some embodiments, mobile device 46 may be equipped with an application that not only provides data and information from hubodometer 10 to a mobile device, but further allows for hubodometer 10, or alternatively multiple hubodometers 10, to be programmed, calibrated, or otherwise controlled by the mobile device. For instance, the mobile device application may allow an operator to manually input the rotating radius (i.e., tire size) that corresponds with a particular hubodometer 10. In an alternative embodiment, the mobile device application may comprise a pre-built database of tire sizes to enable direct selection of the rotating radius, rather than requiring manual input. In embodiments, communication module 44 may comprise an antenna 56 to allow for any wireless communication with a mobile device comprising a suitable receiver 48. For instance, suitable receiver 48 may be a Bluetooth or wireless receiver disposed in the cabin of a vehicle. Alternatively, suitable receiver 48 may be installed at the entrances or exits of specific areas. The wireless communication systems utilized may include, without limitation, Bluetooth systems, Wi-Fi systems, and the like. In embodiments, Bluetooth system frequency ranges between about 2.4 GHz and about 2.6 GHz.

In embodiments, the electronic components of hubodometer 10 may further comprise power supply unit 52 in order to provide power to accelerometer 2, MCU 40, display unit 42, and communication module 44. Power supply unit 52 may be any suitable battery. In embodiments, the battery may be a long-lasting lithium-ion battery of any suitable grade. Further, the battery may be rechargeable or disposable. In order to save power, communication module 44 and display unit 42 may only be activated for necessary communication. Further to save power, the scanning frequency of MCU 40 may be dropped to lower levels under certain working conditions such as, without limitation, constant speeds or stopping. Finally, a pre-setting shipping model may also save power.

During operation, accelerometer 2 of hubodometer 10 may activate upon detection of a vibration. In embodiments, the accelerometer data may be collected at a frequency of about 8 times per second. MCU 40 may compare the two sequential pieces of accelerometer data by subtracting the first piece of accelerometer data from the second piece of accelerometer data. This may result in one piece of difference data. Next, two sequential pieces of difference data may be multiplied and the results evaluated. If the results are negative, hubodometer 10 may have rotated a half circle. In this way, the accumulated rotation of hubodometer 10 may be calculated and then multiplied by the tire circumference. This may result in MCU 40 calculating total distance traveled which may be capable of being transmitted to display unit 42 and/or communication module 44.

Each of the electronic components including, accelerometer 2, MCU 40, display unit 42, multifunctional button 50, communication module 44 and power supply unit 52 communication module 44 may be configured and/or incorporated onto a printed circuit board (PCB). Utilization of the PCB allows for all the electronic components of hubodometer 10 to be securely enclosed within outer housing 14. In embodiments, the front face of outer housing 4 and the PCB may be vertical to the ground. Further, the PCB may be mounted to a back of display unit 42.

Although the present invention and its advantages have been described in detail, it should be understood that various changes, substitutions and alterations may be made herein without departing from the spirit and scope of the invention as defined by the appended claims.

What is claimed is:

1. A universal electronic hubodometer comprising:
   an accelerometer comprising a single accelerometer sensor for measuring force in any given direction, wherein the single accelerometer sensor comprises a 3-axis digital accelerometer;
   a microcontroller unit (MCU), wherein the MCU comprises internal read-only memory (ROM) and random access memory (RAM), and further wherein the MCU processes data generated by the accelerometer;
   a communication module, wherein the communication module wirelessly transmits any data processed by the MCU to a mobile device and wirelessly receives any data from the mobile device, and further wherein the communication module comprises a wireless Bluetooth system; and
   a power supply, wherein the power supply provides power to the accelerometer, the MCU, and the communication module;
   wherein the accelerometer, the MCU, the communication module, and the power supply are configured onto a printed circuit board (PCB) and disposed within an outer housing.

2. The universal electronic hubodometer of claim 1, wherein the accelerometer is disposed on the PCB at an angle between about 45° and about 75° relative to a center of the PCB.

3. The universal electronic hubodometer of claim 1, wherein the accelerometer is disposed on the PCB at a distance between about 5 mm and about 25 mm from a center of the PCB.

4. The universal electronic hubodometer of claim 1, further comprising a display unit disposed on a front face of the universal electronic hubodometer.

5. The universal electronic hubodometer of claim 4, wherein the data processed by the MCU is transmitted to the display unit.

6. The universal electronic hubodometer of claim 1, further comprising a multifunctional button disposed on a front face of the universal electronic hubodometer, wherein the multifunctional button is capable of placing the hubodometer into a Bluetooth pairing mode.

7. The universal electronic hubodometer of claim 1, wherein the mobile device is selected from a group consisting of a mobile phone, PDA, cell phone, smartphone, laptop, and tablet.

8. The universal electronic hubodometer of claim 1, wherein the mobile device comprises an application that allows the universal electronic hubodometer to be wirelessly programmed, calibrated, or otherwise controlled.

9. A method for monitoring rotation data of an object comprising:
(A) attaching a universal electronic hubodometer to a hubcap on a wheel of a vehicle, wherein the universal electronic hubodometer comprises:
an accelerometer comprising a single accelerometer sensor for measuring force in any given direction, wherein the single accelerometer sensor comprises a 3-axis digital accelerometer, and further wherein the single accelerometer sensor is disposed at an angle of 60 degrees relative to the center of the wheel, and further wherein the single accelerometer is disposed at a distance of between 5 mm and 25 mm from the center of the wheel;
a microcontroller unit (MCU), wherein the MCU comprises internal read-only memory (ROM) and random access memory (RAM), and further wherein the MCU processes data generated by the accelerometer;
a communication module, wherein the communication module wirelessly transmits any data processed by the MCU to a mobile device and wirelessly receives any data from the mobile device, and further wherein the communication module comprises a wireless Bluetooth system;
a multifunctional button disposed on a front face of the universal electronic hubodometer, wherein the multifunctional button is capable of placing the hubodometer into a Bluetooth pairing mode; and
a power supply, wherein the power supply provides power to the accelerometer, the MCU, and the communication module;
wherein the accelerometer, the MCU, the communication module, and the power supply are configured onto a printed circuit board (PCB) and disposed within an outer housing;
(B) activating the accelerometer upon detection of vibration and generating accelerometer data;
(C) allowing the MCU to collect and process the generated accelerometer data into useful data comprising revolution count, distance, velocity, and acceleration of an object, wherein the accelerometer data is collected at a frequency of 8 times per second;
(D) comparing two sequential pieces of accelerometer data by subtracting the first piece of accelerometer data from the second piece of accelerometer data;
(E) transmitting the useful data to the communication module; and
(F) wirelessly accessing the useful data via the mobile device.

10. The method of claim 9, wherein the universal electronic hubodometer is attached to the hubcap via L-shaped legs that extend from a back of the outer housing and are screwed into the hubcap.

11. The method of claim 9, wherein the universal electronic hubodometer further comprises a display unit disposed on a front face of the universal electronic hubodometer.

12. The method of claim 11, wherein the data processed by the MCU is transmitted to the display unit.

13. The method of claim 9, wherein the mobile device is selected from a group consisting of a mobile phone, PDA, cell phone, smartphone, laptop, and tablet.

14. The method of claim 9, wherein the mobile device comprises an application that allows the universal electronic hubodometer to be wirelessly programmed, calibrated, or otherwise controlled.

\* \* \* \* \*